May 19, 1953  D. M. GROVES  2,639,155
APPARATUS FOR SUPPORTING AND MANIPULATING PHONOGRAPH RECORDS
Filed March 27, 1947  7 Sheets-Sheet 1

Inventor
David M. Groves
By Henry C. Parker
Attorney

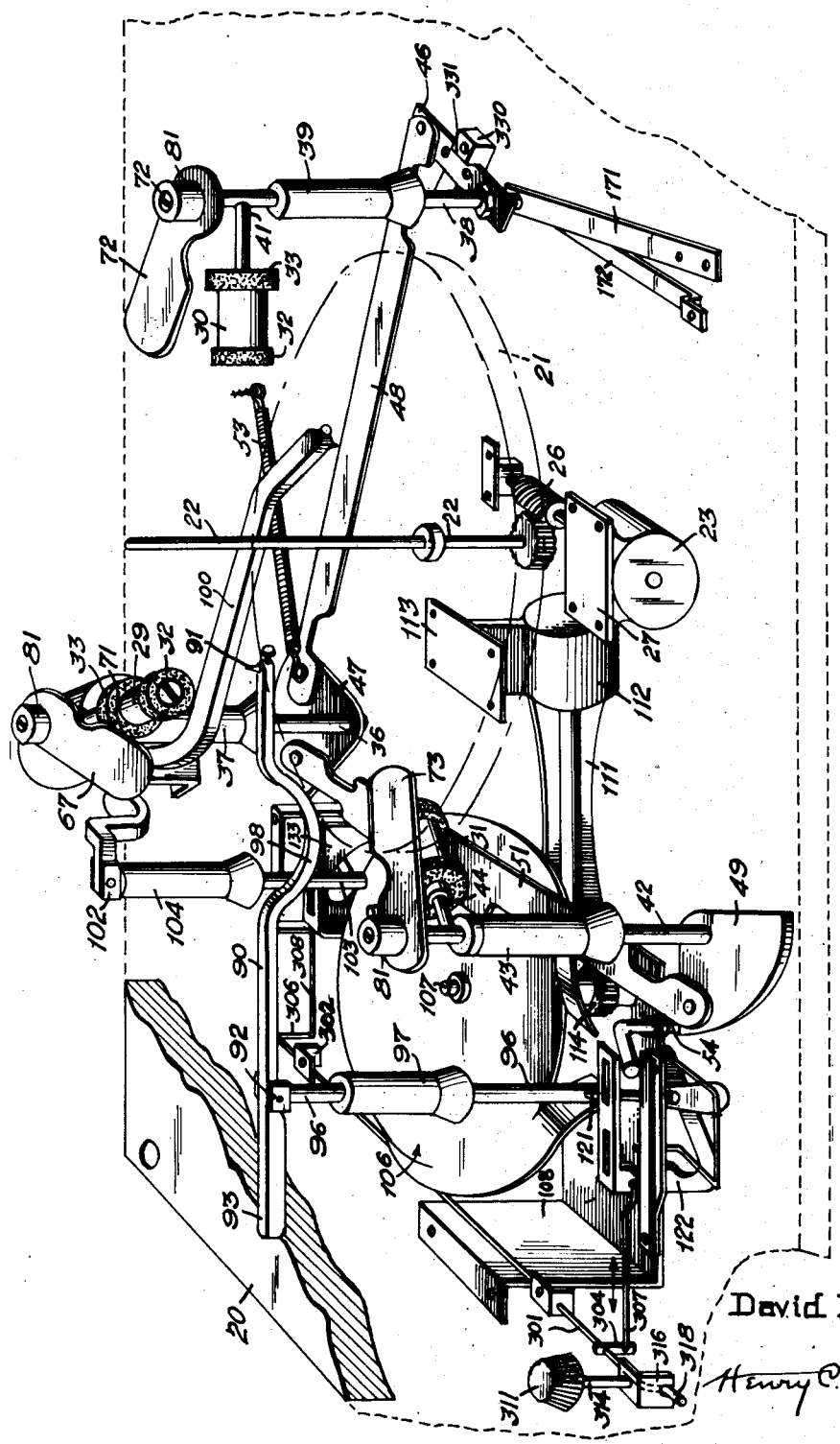

Inventor
David M. Groves
By Henry C. Parker
Attorney

May 19, 1953        D. M. GROVES        2,639,155
APPARATUS FOR SUPPORTING AND MANIPULATING PHONOGRAPH RECORDS
Filed March 27, 1947        7 Sheets-Sheet 4
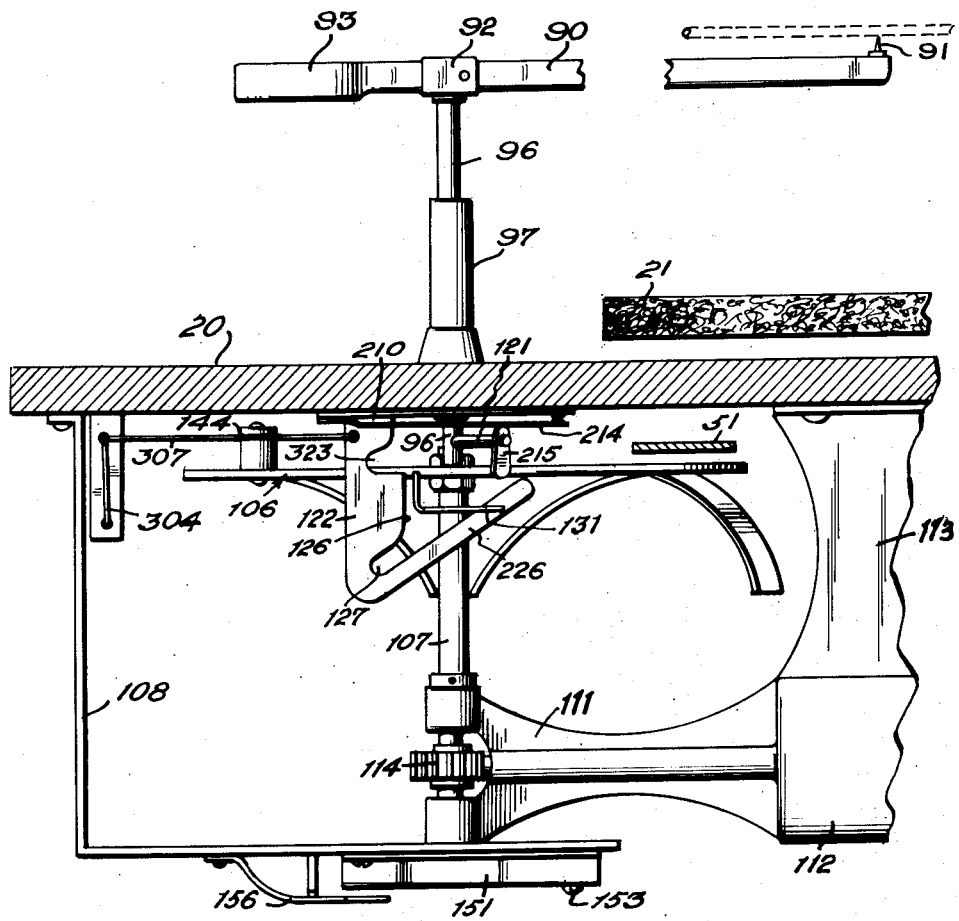
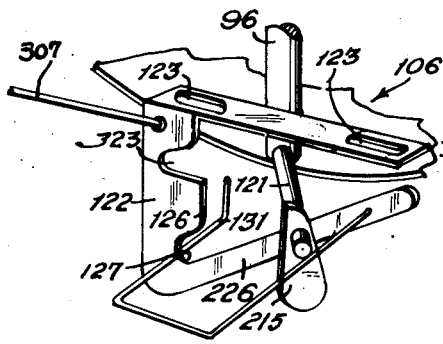
Inventor
David M. Groves
By Henry C. Parker
Attorney May 19, 1953  D. M. GROVES  2,639,155
APPARATUS FOR SUPPORTING AND MANIPULATING PHONOGRAPH RECORDS
Filed March 27, 1947  7 Sheets-Sheet 5
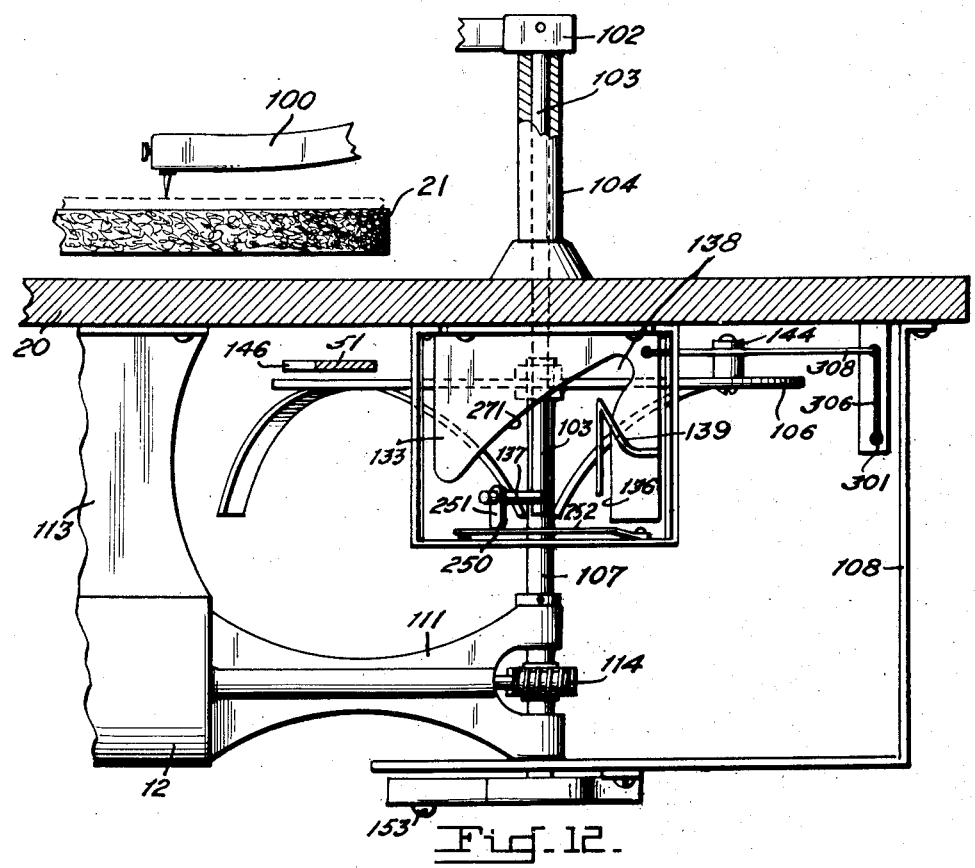
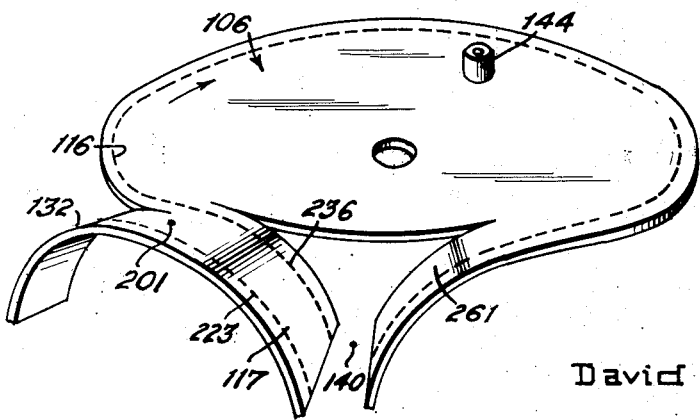
Inventor
David M. Groves
By Henry C. Parker
Attorney

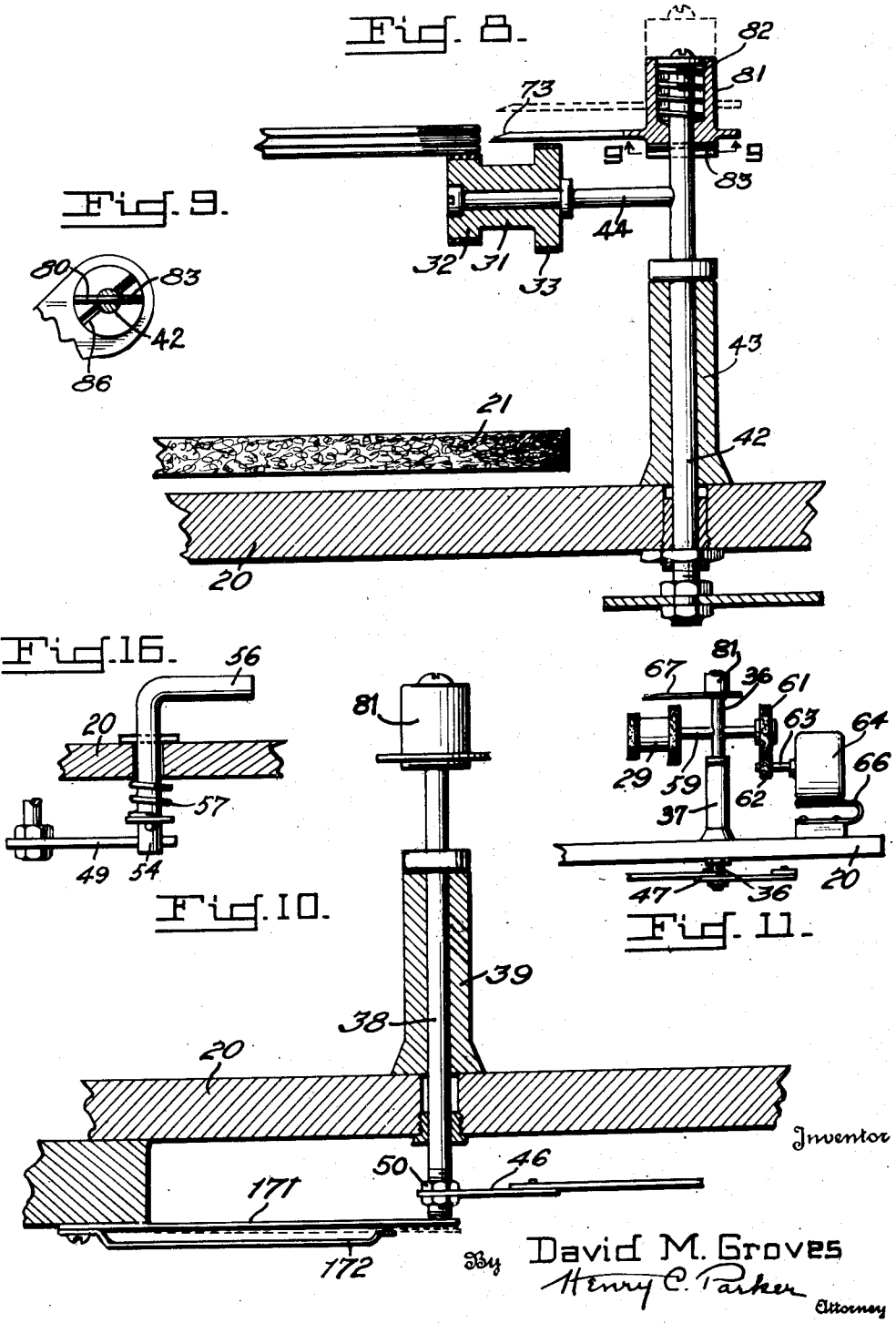

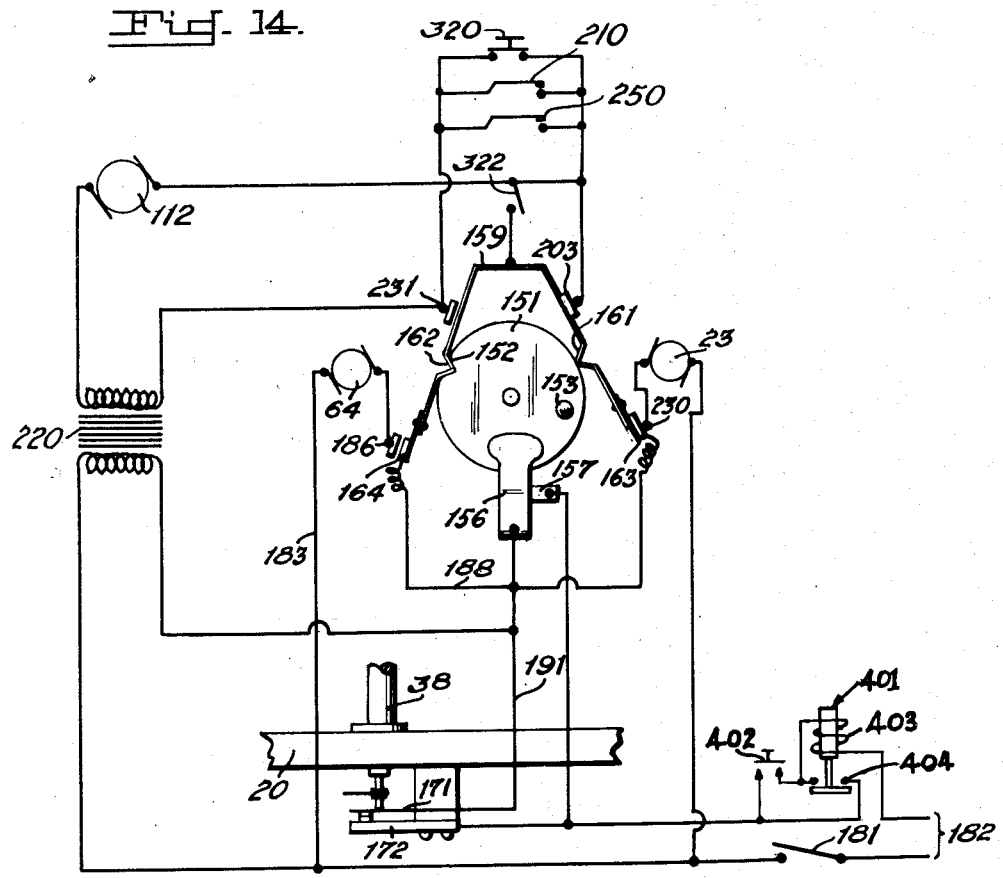
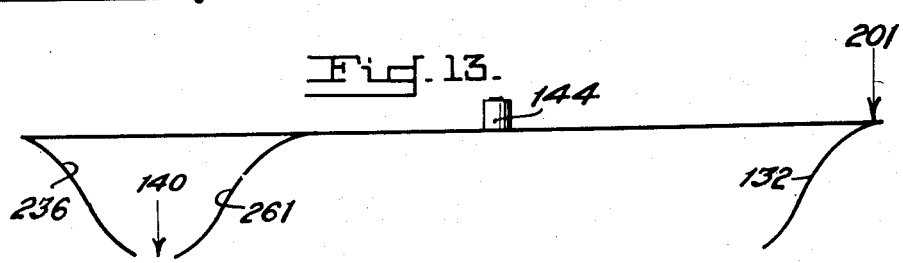
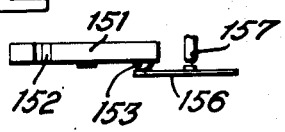

Patented May 19, 1953

2,639,155

UNITED STATES PATENT OFFICE 2,639,155

APPARATUS FOR SUPPORTING AND MANIPULATING PHONOGRAPH RECORDS

David M. Groves, Knoxville, Tenn.

Application March 27, 1947, Serial No. 737,586

9 Claims. (Cl. 274—10)

The present invention relates to apparatus for supporting and manipulating phonograph records in such a manner that the under face of a record may be engaged by the stylus of a tone arm and thereafter the upper face exposed to the action of a pick-up whereby the sound track carried by opposite sides of each record in a group of records may be automatically reproduced.

An object of the present invention is to provide means for supporting a plurality of records as a stack in spaced relation above a turntable and means for rotating the stack whereby the under face of the lowermost record may be reproduced, including novel means for releasing the lowermost record for downward movement onto the turntable while the remaining records of the stack are maintained in spaced relation above the turntable.

Another object of the invention is to provide means for automatically retracting the tone arm from a position engaging the under face of the lowermost record in the stack prior to the release of this record for downward movement onto the turntable.

A still further object of the invention resides in the provision of driving means for the stack of records so constructed and arranged that rotation of the elevated group of records is interrupted before the lowermost record is permitted to drop onto the turntable to thereby avoid hurling of the released record.

A more specific object of the invention is to provide a plurality of circumferentially spaced rollers for supporting a multiplicity of ten inch or twelve inch records as a juxtaposed group above a record player turntable, including a finger or blade associated with each roller adapted to support the remaining records when the lower record is released for movement to a playing position on the turntable.

A further object pertains to the adjustment of the position of each finger or blade relative to the associated roller to provide proper handling of ten or twelve inch records.

Another detailed object of the invention relates to the shape of the fingers or blades which are designed to facilitate the entry of these members between two adjacent records prior to the transfer of the lowermost record onto the turntable.

Another and further object of the invention is to provide reliable and efficient driving means for rotating the records supported above the turntable whereby the sound track carried by the under face of the lower record may be reproduced.

Another significant object of the present invention is to provide control means for maintaining rotation of the stack of records as the fingers or blades move inwardly towards the periphery of the juxtaposed record stack to promote entry of the blades between the lowermost record and the penultimate disc, even though the records may be warped.

A further object of the invention pertains to mechanical means for moving the upper tone arm to a position laterally of the record stack after the underside of the lower disc thereof has been played and for operating the supporting means for the record stack to allow the lowermost record to move downwardly onto the turntable and to thereafter move the lower tone arm to a position to engage the sound track carried by the upper face of the record which is then positioned on the turntable.

A still further object of the invention is to provide electrical control means in combinations with the mechanical means to start and interrupt the operation of motors driving the record stack and driving the turntable and to start and stop a motor for driving the mechanical control means.

Another object of the invention relates to means for guiding the tone arms to operative positions in relation to the sound track carried by each face of each record and for swinging the tone arms to positions free of the records after each playing operation.

A further object of the invention relates to electrical control means including a unique switch mechanism operable when the tone arm first moves radially outwardly with reference to the record as a result of a stylus moving in the eccentric groove at the end of the sound track for initiating actuation of the control mechanism to effect movement of parts of the apparatus to the next stage in the automatic cycle of operation.

Another object of the invention is to provide means operable in the absence of a record in the stack for preconditioning the electrical control system to interrupt operation of the apparatus when the upper face of the record on the turntable has been played.

A further object of the invention is to provide a linkage mechanism for controlling the operation of the supports which maintain the records in a stack above the turntable including manually operable means for releasing the linkage mechanism for movement to a position whereby the records may be readily removed from the turntable.

A still further object pertains to a safety latch preventing operation of the linkage mechanism to fully released position as long as a record is supported above the turntable.

Other objects and features of the invention will be more apparent as the present disclosure proceeds and upon consideration of the accompanying drawings and the following detailed description wherein apparatus exhibiting the invention is disclosed.

In the drawings:

Fig. 2 is a general organizational perspective view of the elements with a number of the parts omitted to illustrate the relationship of the members of the record player.

Fig. 4 is a fragmentary sectional view taken on the line 4—4 of Fig. 1 and showing a guide for the upper tone arm.

Fig. 5 is a perspective view of the guide and the parts associated therewith for swinging the upper tone arm.

Fig. 6 is a fragmentary sectional view taken on the line 6—6 of Fig. 1.

Fig. 8 is a partial sectional view of one of the stack supporting rollers taken on the line 8—8 of Fig. 1.

Fig. 9 is a view of the lower end of one of the finger adjusting knobs taken on the line 9—9 of Fig. 8.

Fig. 10 is a sectional view of another of the record stack supports taken on the line 10—10 of Fig. 1.

Fig. 11 is a side elevational view of another of the stack supporting rollers showing the drive therefor.

Fig. 12 is a perspective view of a cam member for mechanically operating the tone arms.

Fig. 13 is a diagrammatic view showing the profile of the cam illustrated in Fig. 12.

Fig. 14 is an inverted plan view of the electrical control cam and the circuits associated therewith for controlling operation of the record player.

Fig. 15 is a diagrammatic side elevational view illustrating the manner in which the electrical cam actuates a switch to interrupt operation of the apparatus after the last record has been played on its upper face.

Fig. 16 is a sectional view taken on the line 16—16 of Fig. 1 showing the manual release for the stack supporting rollers.

The present invention is directed to a record player of the type which provides for the reproduction of the sound track carried by the under face of a phonograph record and the reproduction of the sound track carried by the upper face of the same record. To provide such operation, a group of records are supported in a juxtaposed manner above the turntable in such a spaced relation as to permit a tone arm to swing along the under face of the lower record in the stack. Thereafter, this tone arm is re-moved to a position outside the diameter of the records after which the lowermost record is released for movement onto the turntable. A second tone arm is then moved to a position to engage the sound track carried by the upper face of the record on the turntable. The invention includes control means providing for automatic operation of the apparatus to carry out such a cycle of reproducing the sound tracks. The invention also includes means rendering one of the tone arms inoperative so that only one face of the records is reproduced and means for rejecting any record which is not desired to be reproduced.

Figure 1:
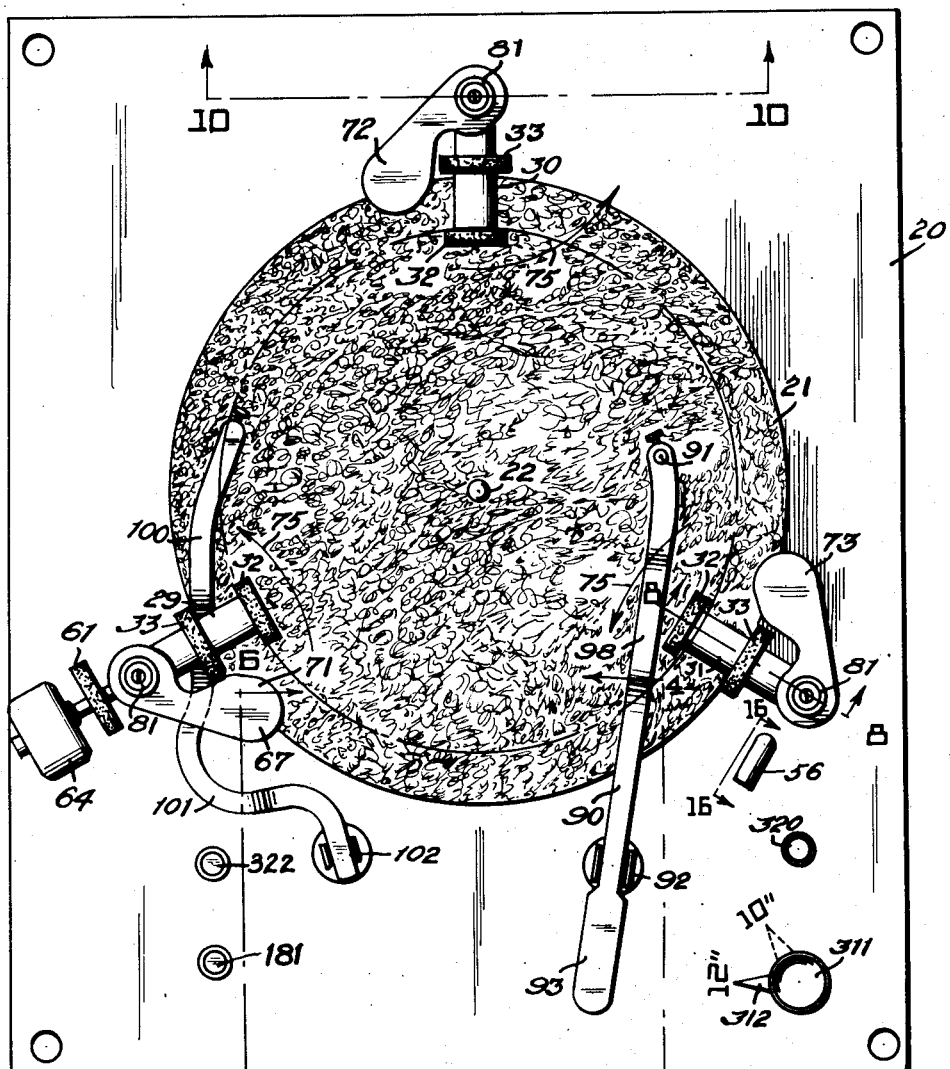
Fig. 1 is a plan view of a record player embodying the invention showing the turntable and the supporting means for a group of records.

Referring to the drawings, there is shown at 20 a mounting board which may be formed of any suitable material and provides the base on which various parts of the apparatus are supported. The mounting board may be formed of wood, plastic or any suitable material and may be rectangularly shaped as shown in Fig. 1 so as to be mounted in a cabinet to thereby conceal the major portion of the automatic control mechanism which is arranged under and suspended from the mounting board.

The apparatus includes a turntable 21 arranged above the mounting board 20 and adapted to be supported for rotation in a horizontal plane. The turntable is driven by vertical shaft or spindle 22 which extends below the mounting board and is driven by a motor 23 through any suitable type of gearing mechanism such as a worm gear assembly 26. The motor 23 may be mounted on the under face of the mounting board by means of an inverted base 27 as shown at Fig. 2. One of the non-conventional features of the turntable includes the feature of the spindle 22 which extends upwardly a material distance above the top face of the turntable and for a distance sufficient for extending through the axial opening in a plurality of disc shaped records supported in a stack above the turntable. The elongated character of the spindle 22 is shown in Fig. 2.

The invention includes a unique mechanism for supporting a plurality of records above the turntable 21. This supporting means includes a plurality of rollers 29, 30 and 31. These rollers are arranged in a circumferentially spaced relationship about the spindle 22 and are normally maintained in radial positions as shown in Fig. 1, so as to support one or more records thereon. Each roller is provided with two rim portions. The smaller rim portion 32 is adapted for engaging under the peripheral edge of a ten inch record, while the larger diameter rim portion 33 of each roller is adapted for being engaged by the peripheral edge portion of a twelve inch record. The difference in diameter of the rim portions 32 and 33 is for the purpose of driving a record of ten inch diameter at substantially the same speed as that imparted to a twelve inch record supported on the larger and outer rim 33 of the roller. The rim portions 32 and 33 may be covered with some resilient material, such as rubber, to prevent scratching or marring of the records and to reduce the noise of the engagement of the rollers with the records and for the purpose of driving the records as hereinafter described.

The rollers 29, 30 and 31 are supported above the turntable by means of a plurality of vertical shafts. A shaft 36 extends upwardly through a suitable bearing in the mounting board 20 and the bearing therefor is preferably of a tubular type as shown at 37. This tubular member 37 provides means for stabilizing the shaft 36 and permitting rotation thereof relative to the mounting board. The roller 29 extends laterally from the upper end portion of the shaft 36 in a rigid manner so that the roller 29 will swing upon rotation of the shaft 36. The vertical shaft 36 is restrained from downward movement by a collar secured to the shaft 36 and riding on the upper end of the bearing 37. A similar shaft 38 extends upwardly through the mounting board 20 and through a tubular guide member 39. The roller 30 is mounted on a shaft 41 which extends laterally from the shaft 38 above the tubular guide member 39. A shaft 42 extends upwardly through the mounting board 20 and through a guide member 43 as shown in Fig. 2. The upper end portion of the shaft 42 carries a laterally extending shaft 44 on which the roller 31 is rotatably mounted. The shaft 42 is prevented from moving downwardly in the associated tubular guide member in any suitable manner.

Figure 3:
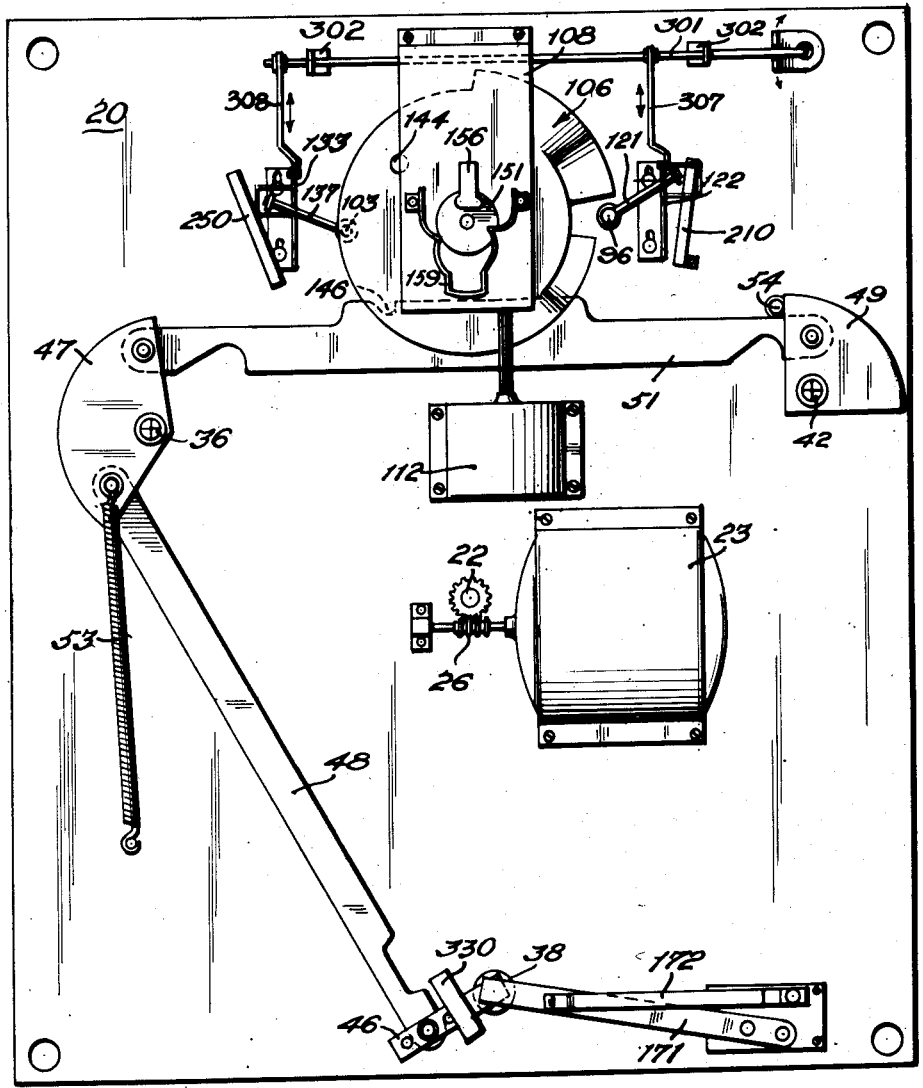
Fig. 3 is an inverted plan view as the parts appear looking up from a position under the mechanism.

The shafts 36, 38 and 42 are each adapted to be rotated in unison when it is desired to release a record from the stack supported on the rollers. The lower end of the shaft 38 carries an arm 46 which is rigidly mounted thereon so that upon swinging movement of the arm 46 the shaft 38 is rotated. A sector shaped plate 47 is secured to the lower end of the shaft 36. The outer end of the arm 46 is connected to the plate 47 by means of a link 48. The lower end of the shaft 42 carries a triangularly shaped plate 49 which is secured in a non-rotatable manner thereon. A link 51 connects the plate 49 to the plate 47. A spring 53 is connected to the link 48 at one end and attached at its other end to the under side of the mounting board 20. This spring 53, as shown in Fig. 3, biases the linkage mechanism against a stop member 54 so as to maintain the rollers in substantially radial positions. The stop member 54 is mounted adjacent the triangularly shaped plate member 49. This stop member 54 is shown more clearly in Fig. 16, and may be manually operated to free the plate 49 so as to permit the spring 53 to swing the linkage mechanism and turn the shafts 36, 38 and 42 about their axis as shown in Fig. 2, and the purpose thereof will be more apparent as the present description proceeds. The stop member 54 extends upwardly through the mounting board 20 and terminates in a handle 56 which may be manually operated to release plate 49. A spring 57 normally urges the stop member to the operative position shown in Fig. 16.

The rollers 29, 30 and 31 support a group of records above the turntable and the spindle 22 extends through the central opening in the records. The stack of records is thereby maintained in vertical alignment and during one cycle of operation, the entire record stack is rotated so that the sound track carried by the under face of the lowermost record may be reproduced. A driving mechanism for rotating the record stack is shown in Fig. 11. The roller 29 is non-rotatably secured to a shaft which extends through a tubular bearing 59. The tubular bearing 59 is rigidly secured to the shaft 36. The roller shaft carries a friction wheel 61 and this wheel is adapted to be engaged by the periphery of a pinion 62 carried by a motor shaft 63. The motor 64 is mounted on the board 20 in a resilient manner as represented by the U-shaped spring element 66. This spring arrangement 66 provides for a resilient mounting of the motor 64 to prevent vibration of the record playing mechanism and to resiliently urge the pinion 62 into engagement with the friction wheel 61. Accordingly, when the motor 64 is energized, the shaft which extends through the tubular bearing 59 is rotated to drive the roller 29. A group of records supported on the three rollers in a manner somewhat as represented in Fig. 8 will thereby be rotated, since the supporting roller 29 is driven to move the peripheral portion of the record resting thereon. The rubber tread on the rim of the roller 29 provides means increasing the friction between the records and the roller 29 to thereby improve the driving of the records. The records in the stack are prevented from moving laterally off the rollers by the spindle 22.

It will be observed that the motor 64 is maintained in a substantially fixed position and upon turning movement of the shaft 36 the friction wheel 61 will move out of engagement with the friction pinion 62 and accordingly interrupt the drive of the roller 29. Thus, after some swinging movement of the stack supporting roller preliminary to release of one of the records of the stack, the drive of these records is interrupted. This feature is advantageous and prevents hurling of the record as it is released from the stack.

The supporting means for the records includes a finger or blade mounted adjacent each roller. A blade 67 is associated with the roller 29 and secured to the shaft 36. The blade 67 extends from the shaft 36 at an angle with respect to the axis of the roller 29. This finger or blade 67 is provided with a relatively sharp forward edge 71. The blade 67 is positioned above the periphery of the rim 32 a distance approximating that of the thickness of a phonograph record when the blade 67 is in a position for handling ten inch records. A similar blade 72 is associated with the roller 30 and secured to the shaft 38. Another blade 73 is associated with the roller 31 and arranged in a non-rotatable manner on the shaft 42.

The structural features of the blades or fingers may be varied from that illustrated and the invention includes the feature of adjusting the position of these fingers relative to the axis of the supporting rollers so as to accommodate ten inch and twelve inch records. When it is desired to release a record from the stack, the supporting rollers are each turned in the direction of the arrows 75 in Fig. 1. Prior to the release of the rollers from engagement with the under face of the lowermost record, the blades 71, 72 and 73 enter the crease between the lowermost record and the penultimate record of the stack, and thereby support the remaining records of the stack until the rollers are returned to the positions shown in Fig. 1 by means of the spring 53 acting on the linkage mechanism. When twelve inch records are supported on the larger rim portions 33 of the rollers, the fingers 67, 72 and 73 are adjusted outwardly. This adjustment is made possible by lifting a knob 81 as shown in Fig. 8 against the action of a helical spring 82. This upward movement of the knob 81 and the finger carried thereon clears a pin 83 which extends through the shaft 42. A radially arranged groove 80 in the under side of the knob 81 is thereby removed from engagement with the pin 83 so that the finger 73 may be turned to a position where the groove 86 is in alignment with the pin 83. This groove 86 is of less depth than the groove 80 and thereby positions the blade 73 at such a distance above the rim 33 of the roller 31 that the bevelled forward edge will be spaced above the rim 33 a distance approximating the thickness of one record. This position of the blade 73 is also outward of that shown in Fig. 1 so as to lie along the periphery of a twelve inch record resting on the larger rims of the supporting rollers. The fingers or blades 67 and 72 are each carried by a similarly constructed knob, one of which is mounted on each of the vertical shafts 36 and 38.

A tone arm hereinafter referred to as the upper tone arm, is shown at 90 in the drawings. This tone arm is adapted to engage the under surface of a record supported on the rollers. The tone arm carries a stylus 91 which is directed upwardly as shown in Figs. 1 and 2. The tone arm 90 is supported in a cradle 92 and is pivotally secured thereto so as to have limited swinging movement. A weight 93 is carried by the rear end portion of the tone arm so as to normally swing the free end of the tone arm upwardly to cause the stylus 91 to engage the under side of the record. A rod 96 supports the cradle 92 and extends downwardly through a tubular sleeve 97. This sleeve terminates above the mounting board 20 and provides means for limiting downward movement of the rod 96 and accordingly the cradle 92. The rod 92 extends freely through the mounting board 20 and terminates adjacent a tone arm operating cam hereinafter described. The upper tone arm 90 is provided with an arcuate shaped portion 98 so as to avoid engagement with the roller 31.

The lower tone arm is shown at 100 and this tone arm includes a curved portion 101 so as to avoid engagement with the tubular member 37. The free end of the tone arm 100 carries a stylus on the under side thereof for engaging the upper surface of a record supported on the turntable 21. The other end of the tone arm 100 is mounted in a cradle member 102 carried by the upper end of a rod 103. This rod extends through a sleeve 104 which projects upwardly from the mounting board 20 and provides means for limiting the downward movement of the rod 103 in that the upper end of the sleeve 104 provides an abutment for the cradle 102. The lower end of the rod 103 also terminates adjacent the cam which controls the position of both tone arms.

The tone arm operating cam is shown at 106 in Fig. 12, and is arranged under the mounting board 20 in a position adjacent the lower ends of the rods 96 and 103. The cam is supported for rotation in a substantially horizontal plane by means of a shaft 107. This shaft may be supported in any suitable manner, such as by means of a bracket 108 and a bracket 111 carried by an electric motor 112. The motor 112 is provided for the purpose of driving the cam 106 and may be secured to the under face of a mounting board 20 and secured in position by an inverted base 113. The bracket 111 is provided with bearings for supporting the shaft 107 which is driven by means of a worm gearing arrangement 114 shown particularly in Fig. 6. Accordingly, when the motor 112 is energized the shaft 107 is rotated to turn the cam member 106.

The cam member 106 is provided with two cam tracks, one of which is provided for the manipulation of the tone arm rod 96 and the other cam track is provided for manipulating the tone arm operating rod 103. The rod 96 is located at a greater radial distance from the axis of the cam 106 than the rod 103. Accordingly, the rod 103 is adapted to engage the cam member in a path as indicated by the dotted line 116 in Fig. 12, whereas the rod 96 is adapted to engage only that portion of the cam as represented by the dotted line 117 in Fig. 12.

The lower end of the rod 96 carries a laterally extending arm 121 which is provided for the purpose of following a guide member and accordingly turning the rod 96 about its axis so as to swing the tone arm 90 to a proper position with reference to the start portion of a sound track carried by the under face of a record. The guiding means for this tone arm is shown in Figs. 4 and 5 and includes a bracket 122 which is secured to the under face of a mounting board 20 by means of a plurality of screws or the like which extend through slots 123 in the upper flange of the bracket. The bracket 122 carries a guiding edge 126 so that when the arm 121 moves upwardly from a point 127, the arm 121 is guided by the shape of the edge surface 126. The arm is maintained in engagement with this surface by means of a spring 131. This spring is in the form of an L-shaped leaf spring having the free end substantially parallel with the edge 126. The rod 96 is moved upwardly when the cam portion 132 engages the lower end of the rod 96. Accordingly, as the rod 96 moves upwardly and the cradle 92 is moved upwardly the stylus 91 is arranged in a plane corresponding substantially with the under surface of the lowermost record of the stack. After the arm 121 passes over the upper end of the spring 131, this arm is free to turn to the position shown in Fig. 5, and the tone arm is accordingly free to swing inwardly over the record and follow the groove which provides the sound track.

Figure 7:
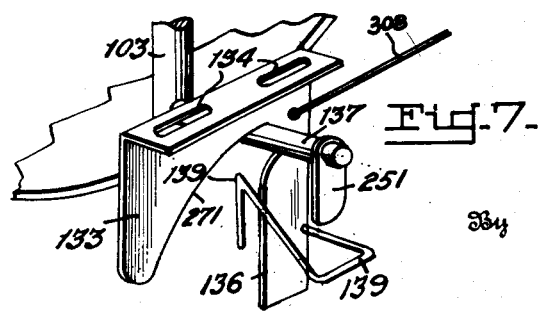
Fig. 7 is a perspective view of the guide means for the lower tone arm.

A similar but inverted tone arm guide is provided for the lower tone arm 100. This tone arm guide is illustrated in Figs. 6 and 7 wherein a bracket 133 is secured to the under face of the mounting board by a plurality of screws or the like which extend through the slots 134 in the upper flange of the bracket 133. In this tone arm guide the edge 136 provides a guide for an arm 137 which extends laterally from the lower end of the rod 103. Thus, as the tone arm rod 103 moves downwardly from an inoperative position, indicated at 138 in Fig. 6, the arm 137 moves along the edge 136 to swing the free end of the tone arm 100 to a position adjacent the starting groove in the upper face of a record supported on the turntable 21. The arm 137 is maintained along the edge 136 by means of a leaf spring 139. The rod 103 is maintained in the elevated and inoperative position by the lower end riding on the flat horizontal portion of the cam 106 as indicated by a portion of the dotted line 116 in Fig. 12. When the lower tone arm 100 is to be moved into an operative position relative to the record on the turntable, the cam 106 is in such a position that the rod 103 moves downwardly into the space indicated at 140, in Figs. 12 and 13. During this downward movement of the rod 103 the arm 137 moves along the guide surface 136 and swings the tone arm to an operative position relative to the start of the sound track in the record on the turntable.

The cam 106 carries a lug or roller 144 which is adapted to operate the linkage mechanism for swinging the rollers 29, 30 and 31 supporting the stack to release one of the records for movement onto the turntable. This roller 144 is adapted to engage a notch 146 in the link 51 and to move this linkage mechanism against the tension of the spring 53. This roller 144 is positioned in such a radial position on the cam 106 as to avoid engaging the depending tone operating rods 96 and 103.

The lower end of the shaft 107 carries a disc 151 formed of insulating material. This disc is attached to the shaft 107 so as to turn therewith and is provided with a notch 152 in the periphery thereof as shown in Fig. 14. The disc 151 also is provided with a protuberance 153 which depends from the lower face thereof and is adapted to engage a switch blade 156 and move this switch blade from engagement with a contact 157 as shown in Fig. 15. A conducting member 159 of generally V-shape is arranged to partially span the disc 151. This conducting member is formed to be resilient and one leg thereof carries a projection 161 while the other leg is provided with a projection 162 as shown in Fig. 14. This conducting member may be bolted or otherwise secured in an insulated manner on the bracket 108. A contact 163 is carried by one leg of the conducting member 159 and insulated therefrom. A similar contact 164 is carried by the other leg of the conducting member 159 and insulated therefrom.

The shaft 38 which supports the roller 30 is mounted for limited vertical movement relative to the tubular member 39, as shown particularly in Fig. 10. The shaft 38 is moved downwardly when one or more phonograph records is supported on the rollers or the fingers. A leaf spring 171 moves the shaft 38 upwardly slightly and as limited by the nut 50 when there are no longer any records supported above the turntable. This upward movement of the shaft 38 in response to the force of the spring 171 removes the spring 171 from engagement with a switch contact 172, and the opening of this switch preconditions the apparatus for interruption at a later stage in the cycle of operation as hereinafter described.

The normal position of the apparatus is when no records are present on the turntable or on the supporting rollers. In this condition the tone arms are in inoperative position, as a result of a previous cycle of operation. The tone arm 100 is then elevated and the lower end of the rod 103 is riding on a horizontal flat portion of the cam 106 and the arm 137 is then in the position shown in Fig. 7 so that the tone arm 100 is positioned outside the diameter of the turntable. The tone arm 90 is in a lower inoperative position and the rod 96 is free of the cam 106. The arm 121 is then at the point 127 in Fig. 5.

The electrical cam or disc 151 is then in a position with the protuberance 153 lying under the switch blade 156. One or more records may then be arranged on the spindle 22 and the periphery of the lower record will then be supported by the rollers 29, 30 and 31. The weight on the roller 30 moves the shaft 38 downwardly so as to move the spring 171 into engagement with the switch blade 172. Thereupon by closure of a master switch 181 current is supplied from the source 182 to one side of the motor 64 by the conductor 183. The contacts 186 and 164 are then closed since the notch 152 is no longer in register with the projection 162. A circuit is thereby completed through the conductor 188 and the wire 191 and the switch blade 172 to the other side of the supply line. Accordingly, the motor 64 is energized and the stack of records is rotated.

The cam operating motor 112 is also energized to rotate the cam 106 and the disc 151. The cam 106 moves in the direction of the arrow shown in Fig. 12 so that the upper tone arm rod 96 is engaged by the cam surface 132 to move the rod 96 upwardly. As this rod moves upwardly, the arm 121 is guided along the edge 126 and swings the stylus end of the tone arm 90 to a position adjacent the starting groove of the sound track, in the under face of the lowermost record supported on the rollers. The counterweight 93 also operates to swing the stylus end of this tone arm upwardly. As the lower end of the rod 96 arrives at the point indicated at 201 in Figs. 12 and 13, further rotation of the cam 106 is arrested by the interruption of the supply of current to the motor 112. This is accomplished by the notch 152 arriving opposite the projection 161 whereby the circuit to the motor 112 is interrupted adjacent the contact 203. The tone arm 90 is then free to swing radially inward and is guided by the groove forming the sound track in the under face of the lower record in the stack. This movement gradually turns the rod 96 to swing the arm 121 to a position somewhat as illustrated in Fig. 4.

Figure 17:
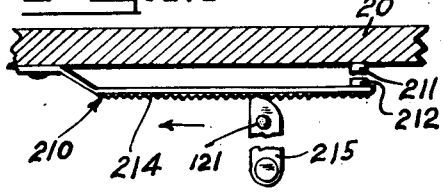
Fig. 17 is an enlarged view of one of the switches actuated upon reverse swinging movement of a tone arm.

A switch represented generally at 210 is adapted to be closed when there is a radial outward movement of the free end of the tone arm 90. This movement of the tone arm results from the stylus riding in the eccentric groove at the small diameter end of the sound track. The switch 210 includes a contact 211 and a contact 212 carried by a blade 214 as shown in Fig. 17. The blade 214 carries a roughened undersurface which may be provided in any suitable manner such as abrasive material or serrations similar to those provided in a file or the like. The outer end of the arm 121 carries a cam member 215 formed of insulating material and during swinging movement of the cam member 215 to the right in Fig. 17 the switch contacts 211 and 212 remain open. However, as the arm 121 moves to the left and in the direction of the arrow in Fig. 17, which movement is in response to the radial outward movement of the tone arm as a result of the eccentric groove, the pointed end of the cam member 215 engages the roughened undersurface of the switch blade 214 and moves the switch blade 214 upwardly to close the contacts 211 and 212 of the switch 210. This switch thereby completes a circuit from the secondary of the transformer 220 to the motor 112 whereby the cam 106 is rotated and the disc 151 moves therewith. The closure of the contacts 211 and 212 is momentary, but as soon as the disc 151 moves the notch 152 out of radial alignment with the projection 161, the switch 210 is bridged and the cam operating motor 112 continues to operate. The cam 106 moves in the direction of the arrow shown in Fig. 12, and the rod 96 then moves downwardly along the surface 223 of the cam. As the rod 96 moves downwardly, the arm 121 engages an angularly arranged bar 226 carried by the bracket 122 to swing the free end of the tone arm 90 to a position outside the diameter of the record stack as it moves downwardly to an inoperative position.

During this rotating movement of the cam 106 the roller 144 engages the link 51 in the notch 146 and swings this linkage mechanism against the action of the spring 53 to thereby rotate the roller supporting shafts 36, 38 and 42 in the direction of the arrow 75 in Fig. 1. During this movement, the friction pinion 62 is disengaged by the friction wheel 61 and the driving roller 29 ceases to operate. Just prior to this interruption of rotation of the stack of records, the fingers on blades 67, 72 and 73 enter between the top surface of the lowermost record and the undersurface of the penultimate record in the stack and thereby support the remaining records of the stack as the lowermost record is released for downward movement on the spindle 22 so as to be supported on the turntable 21. Thereafter the roller 144 escapes from the notch 146 and the linkage mechanism returns to its normal position by the action of the spring 53 whereby the fingers are removed from under the stack of the records and the rollers again support the remaining records of the stack.

As the notch 152 moves from alignment with the projection 161 the contacts 163 and 230 are closed to supply current to the turntable motor 23 which then starts and drives the turntable. The cam 106 continues to rotate until the notch 152 arrives radially opposite the projection 162. The conducting member 159 then disengages the contact 231 to thereby interrupt operation of the cam driving motor 112. The contacts 186 and 164 are also separated at this instant to interrupt the supply of current to the motor 64, and accordingly the rotation of the records in the stack ceases.

During the rotation of the cam 106 to this position, the rod 103 moves downwardly along the cam surface 236 and the lower end thereof arrives in the position indicated 140 in Figs. 12 and 13. This downward movement of the rod 103 causes the arm 137 to move along the guiding edge 136 in Figs. 6 and 7 so as to swing the free end of the lower tone arm 100 to a position matching the diameter of the outer end of the sound track carried by the upper surface of the record on the turntable. The stylus thereby enters this groove and the tone arm 100 gradually swings towards the axis of the disc as this record is being played on its upper face.

Eventually the tone arm 100 arrives at the end of the sound track and the stylus enters the eccentric groove. A switch, shown generally at 250 in Figs. 6 and 14 is quite similar in construction to that shown in Fig. 17 but mounted in an inverted manner adjacent the arm 137. The switch 250 is closed by a non-conducting cam member 251 which normally glides over a switch blade 252 until the stylus enters the eccentric groove and the stylus end of the tone arm 100 moves slightly outward radially. This movement of the tone arm 100 closes the switch 250 which completes the circuit to the cam operating motor 112. The cam operating motor 112 starts and as soon as the disc 151 moves, the switch 250 is bridged or shunted by the closed contacts 203 and 231. The cam 106 is thereby rotated to cause the lower end of the rod 103 to ride upwardly on the cam surface 261, and thereafter is maintained in the elevated position by the lower end of the rod 103 riding on the horizontal portion of the cam 106. The upward movement of the rod 103 causes the arm 137 to engage an angular edge 271 carried by the bracket 133 and thereby swings the free end of the lower tone arm 100 to a position outside the diameter of the records. The current supplied to the turntable motor 23 is interrupted when the notch 152 arrives in radial alignment with the projection 161, whereby the contacts 163 and 230 are separated. The cam-operating motor 112 also stops when the notch 152 is in alignment with projection 161, and the circuit is broken at the contact 203. This position of the cam 106 re-elevates the tone arm 90 to a position for playing the under side of the next record in the stack. Likewise, the stack operating motor 64 is started by the closure of the contacts 164 and 186. It will be appreciated, therefore, that the apparatus provides for the playing of a record on its under face and thereafter reproducing the sound track carried by the upper face of the same record. This automatic operation of the machine continues until the entire stack of records has been played.

The guides for the tone arms are adjustable so as to automatically move the tone arms to proper positions adjacent the beginning of the sound track for ten and twelve inch records. It is for this purpose that the brackets 122 and 133 are provided with the elongated slots so as to permit movement thereof relative to the mounting board 20. A shaft 301 is suspended under the mounting board and journalled for rotation in bearings 302. A crank arm 304 is non-rotatably secured to the shaft 301 as shown in Fig. 2 and a similar crank arm 306 is also attached to the shaft 301 for operating the guide bracket 133. A link 307 is connected to the lower end of the crank arm 304 and attached at its other end to the bracket 122. A link 308 is attached to the lower end of the crank arm 306 and connected to the bracket 133. The shaft 301 is rotated through a limited arc by means of a knob 311 which is arranged above the mounting board 20 and carries an index pointer 312. The mounting board may be marked to indicate ten or twelve inch records. A vertical shaft 314 extends downwardly from the knob 311 and is provided with a lug 316 which is adapted to engage a crank portion 318 forming a part of the shaft 301. When the knob 311 is turned in a counterclockwise direction as viewed in Fig. 1, the crank arms 304 and 306 are turned in a counterclockwise direction about the shaft 301 as viewed in Fig. 2, so as to shift the tone arm guides or brackets 122 and 133 to the left and thereby adapt these tone arm guides for manipulating the tone arms to proper positions for use in connection with twelve inch records.

The apparatus also includes means for rejecting any of the records in the stack. In other words, the invention includes means for rendering the apparatus inoperative to reproduce any one of the records in the group supported on the rollers 29, 30 and 31. This function is accomplished by means of a reject button switch shown at 320, in Figs. 1 and 14. The closure of this switch renders the cam-operating motor 112 operable to continue rotation until the next stage in the automatic cycle of operation is attained. The closure of the reject button 320 completes the circuit to the motor 112. The cam-operating motor then starts, and after the notch 152 leaves either the projection 161 or 162, the reject button switch 320 may be released and the cam-operating motor 112 continues to operate until the circuit thereof is broken at 203 or 231.

The invention also includes means for rendering the apparatus such that the under side of each record in the stack is not reproduced. This function may be accomplished by closing a switch 322 which prevents the cam-operating motor 112 from stopping in the position with the tone arm operating rod 96 in the position 201, as shown in Figs. 12 and 13. During such operation of the apparatus, the tone arm 90 may be moved to inoperative position manually by lifting the tone arm and the rod 96 and turning the tone arm radially away from the turntable until the arm 121 enters the notch 323 in the bracket 122. In this position the tone arm rod 96 is prevented from moving downwardly and the tone arm 90 is then positioned with its free end laterally of the phonograph records.

The stop member 54 is provided for maintaining the stack-supporting rollers in proper positions against the action of the spring 53. After all of the records have moved downwardly on the spindle 22 and are supported on the turntable, and after completion of the reproduction of the top surface of the uppermost record on the turntable, it is desirable to remove the records from the apparatus. Under such circumstances, the handle 56 of the stop member 54 may be moved upwardly whereby the lower end of the stop member 54 is raised above the triangularly shaped plate 49, and the spring 53 then moves the linkage mechanism to turn the vertical shafts 36, 38 and 42 and swing the supporting rollers to more or less tangential positions whereby the records may be lifted upwardly along the spindle 22 without engaging the supporting rollers. Thereafter, one of the rollers, such as 30, may be manually turned to a radial position which will swing the linkage mechanism against the action of the spring 53. The helical spring 57 then moves the stop member 54 to a position for engaging the plate 49. The rollers are then in a position to receive another stack of records.

The invention also includes means for rendering the manually operable member 54 inoperative as long as one or more records is supported on the rollers 29, 30 and 31. This means comprises a detent shown generally at 330 in Figs. 2 and 3, associated with the arm 46. This detent is, therefore, associated with the shaft 38 which is adapted for limited vertical movement in response to the weight of the records in the stack. The detent 330 is so arranged that when the shaft 38 is moved downwardly by the weight of at least one record, the arm 46 engages a shoulder 331 on the detent member 330 and prevents swinging of the linkage in response to the action of the spring 53. Thus, even though the handle 56 may be inadvertently lifted, the linkage mechanism cannot move in response to the energy stored in the spring 53 because the arm 46 is held by the detent 330. The shoulder 331, however, is of limited height so that when the last record moves downwardly onto the turntable, the shaft 38 is moved upwardly by the leaf spring 171 so that the arm 46 is then free for movement in a clockwise direction in Fig. 2 and over and above the shoulder 331. This detent, therefore, prevents inadvertent release of records in the stack for movement onto the turntable which may possibly damage the tone arms or the records if the handle 56 were operated during playing operation of the apparatus.

The invention includes means for automatically arresting operation of the apparatus when the last record of the stack has moved onto the turntable 21 and after the sound track carried by the upper face thereof has been deproduced. This advantageous function is accomplished by means of the vertically movable shaft 38 which moves upwardly in response to the force of the leaf spring 171 when there is no longer any record supported on the vertical shafts 36, 38 and 42. This upward movement of the shaft 38 opens the electrical contacts carried by the leaf spring 171 and the contact 172. This opening of the circuit preconditions the apparatus for interruption as soon as the record on the turntable has been reproduced on its upper face.

When the switch 250 is momentarily closed, the cam-operating motor 112 is energized and starts to drive the cam 106 and the disc 151. In a relatively short interval the protuberance 153 rides under the blade 156 and separates the contacts at 157 to interrupt the supply of electrical energy to the entire system. This interruption of the circuit at contact 157, however, does not take place until the cam 106 has rotated sufficiently to move the tone arm 100 to an inoperative position.

The apparatus is then in condition for another automatic cycle of operation and the arrangement of additional records on the supporting rollers 29, 30 and 31 will cause the shaft 38 to move downwardly so as to close the supply circuit between the leaf spring 171 and the contact 172. This bridges the circuit which is open at the contact 157 to supply electrical energy to the control system of the various driving motors. It will be observed that the protuberance 153 opens the circuit at 157 during each revolution of the disc 151. This opening of the circuit, however, does not interrupt the supply circuit as long as one or more records are supported above the turntable. In this connection, it will be noted that the contacts 171 and 172 are in parallel with the blade 156 and the contact 157.

The invention includes means for preventing inadvertent initiation of an automatic cycle of operation while the master switch 181 remains closed. The electrical contacts 171 and 172 are sensitive, and any accidental downward movement of the rod 38 while removing a group of reproduced records from the turntable or while reloading the apparatus will initiate the operation of another playing cycle. To guard against any accidental starting of the apparatus before it has been properly loaded with records, a relay 401 may be associated with the supply 182. This relay is of a normally open type, and a push button 402 is associated with the relay. When the relay 401 is employed in connection with the power circuit and after a group of records have been arranged on the supporting rollers, the apparatus is started by pressing the push button 402. The closed circuit at the push button will energize the coil 403 so that the contacts 404 are thereby closed. Current is thereby supplied to the transformer 220 so as to initiate operation of the cam operating motor 112. The apparatus accordingly proceeds through the automatic cycle of operation. The relay coil 403 remains energized even after the push button 402 is released, and the contacts 404 remain closed until the circuit is broken at 156 and 157 or when the last record has been played on its upper surface. When the relay 401 is employed, the master switch 181 will normally not be opened when the apparatus is used to play a plurality of stacks of records. The switch 181 under such operation may be used for emergency stops.

The apparatus disclosed includes a transformer 220 which is provided for the purpose of reducing the voltage applied to a number of the control switches. It will be appreciated that the transformer 220 may be omitted, and the voltage of the supply 182 may be employed on the entire control system. In the embodiment illustrated the voltage across the secondary of the transformer 220 is twenty volts in order to reduce arcing of the control contacts and to minimize the insulation necessary in connection with the control circuit.

While the invention has been described with reference to specific structural features and with reference to various types of electrical control elements, it will be appreciated that modifications may be made in the elements of the mechanism and in the general organization as well as the subcombinations of the apparatus. Such modifications and others may be made without departing from the spirit and scope of the invention as set forth in the appended claims.

I claim:
1. In a record player, a mounting board, a turntable mounted for rotation on said board, a plurality of shafts extending upwardly from said mounting board and circumferentially spaced around the turntable, a roller arranged laterally of each of the vertical shafts for supporting a plurality of records above the turntable, means for driving one of said rollers for rotating said records, a tone arm for operative association with an under face of a lowermost of said records, means for moving said tone arm outside the diameter of said records, means operable thereafter for rotating said vertical shafts in unison for releasing the lowermost of said records for downward movement onto the turntable, and a finger carried by each of said vertical shafts spaced above the associated roller a distance substantially equal to the thickness of a record for supporting the records above the lowermost during release of the lowermost record.

2. In a record player, a turntable, a plurality of rollers arranged in a substantially common plane above said turntable and circumferentially spaced therearound to support disc-shaped records above the turntable, means for driving one of said rollers to rotate the disc-shaped records supported on said rollers, a blade associated with each roller and positioned above the periphery of each roller a distance aproximating the thickness of a disc-shaped record, and means for moving said rollers to positions outside the diameter of said disc-shaped records to release the lower record for downward movement onto the turntable and to move the blades under the remaining records.

3. In a record player, a turntable, a plurality of rollers arranged in a substantially common plane above said turntable and circumferentially therearound to support a stack of disc-shaped phonograph records above the turntable, means for driving one of said rollers to rotate the disc-shaped records, a blade associated with each roller and positioned thereabove a distance generally equal to the thickness of a record, means for swinging all of said rollers outside the diameter of the record stack and moving the blades under the records of the stack, and said driving means being adapted to maintain rotation of the records while the blades engage under the records of the stack and to interrupt rotation of the stack before the rollers move clear of records.

4. In a record player, a mounting board, a turntable mounted for rotation on said board, a plurality of vertical shafts extending upwardly from said mounting board and circumferentially spaced around the turntable, a roller arranged laterally of each vertical shaft for supporting a record above the turntable, a motor resiliently supported on said mounting board in a substantially fixed position, a friction wheel carried by one vertical shaft for driving the associated roller, a pinion carried by the motor for engaging said friction wheel, and means for turning the vertical shafts to swing the rollers outside the diameter of said record and to move the friction wheel from engagement with said pinion.

5. In a record player, a turntable, a plurality of rollers arranged in a substantially common horizontal plane above said turntable and circumferentially spaced therearound to support disc-shaped records above the turntable, means for driving one of said rollers to rotate the disc-shaped records supported on said rollers, a blade associated with each roller and positioned above the periphery of the associated roller a distance approximating the thickness of a disc-shaped record, means for shifting said rollers to release the lower record for downward movement onto the turntable and to move the blades under the remaining records, and means for adjusting the position of each blade with reference to the periphery of the associated roller.

6. Apparatus for manipulating and driving a disc-shaped record so that the sound track carried by each face thereof may be reproduced without turning the record comprising in combination, a turntable, a motor for driving the turntable, a plurality of rollers positioned above the turntable, a second motor for driving one of said rollers to rotate a disc-shaped record supported on said rollers, a tone arm mounted in a position for operative association with an under face of the disc-shaped record supported on said rollers, a cam for moving said tone arm to said operative position, a third motor for driving said cam, a source of current, means connecting said source to the second motor to drive the associated roller and the disc-shaped record supported on said rollers, means for connecting the source to said third motor for driving the cam to release the tone arm from operative association from the under face of said record, means operable upon energization of the third motor to shift said rollers to positions releasing the disc-shaped record for downward movement onto the turntable, and means operable after the actuation of said roller releasing means for connecting the first motor to said source to drive the turntable.

7. In a record player, a horizontally disposed turntable, a plurality of rollers arranged in a substantially common generally horizontal plane above said turntable and circumferentially spaced therearound for supporting two juxtaposed disc-shaped records above the turntable, means for driving one of said rollers to rotate said records while supported on said rollers, a blade associated with each roller normally positioned outside the diameter of the records and each blade being positioned above the periphery of each roller a distance approximating the thickness of a disc-shaped record, means for moving said rollers to positions outside the diameter of said records to release a lowermost record for downward movement onto the turntable, and means moving said blades to positions inside the diameter of the records and under the other record prior to the release of said lower record.

8. In a record player, a horizontally disposed turntable, a plurality of rollers arranged in a substantially common generally horizontal plane above said turntable and circumferentially spaced therearound for supporting two juxtaposed disc-shaped records above the turntable, means for driving one of said rollers to rotate said records while supported on said rollers, a plurality of blades circumferentially spaced around the turntable positioned outside the diameter of said records, means for moving said blades to positions inside the diameter of said records and under the upper record and moving said rollers to positions outside the diameter of the lower record to release it for downward movement onto the turntable.

9. In a record player, a horizontally disposed turntable, a plurality of rollers arranged in a substantially common generally horizontal plane above said turntable and circumferentially spaced therearound for supporting two juxtaposed disc-shaped records above the turntable, a spindle extending upwardly from an axis of the turntable to a point above said rollers, means for driving one of said rollers to rotate said records about the spindle while supported on said rollers, a plurality of blades circumferentially spaced around the turntable positioned outside the diameter of said records, means for moving said blades to positions inside the diameter of said records and under the upper record and moving said rollers to positions outside the diameter of the lower record to release it for downward movement onto the turntable, and means for returning the rollers under the unreleased record and moving said blades to positions outside the diameter of the record supported on the rollers.

DAVID M. GROVES.

References Cited in the file of this patent

UNITED STATES PATENTS

| Number | Name | Date |
|---|---|---|
| 336,528 | Puetz, Jr. | Feb. 16, 1886 |
| 1,237,133 | Wildasin | Aug. 14, 1917 |
| 1,241,674 | Sparks | Oct. 2, 1917 |
| 1,547,768 | Little | July 28, 1925 |
| 1,847,400 | Kincannon | Mar. 1, 1932 |
| 1,940,089 | Harrison | Dec. 19, 1933 |
| 1,955,534 | Collison | Apr. 17, 1934 |
| 2,020,538 | Denison | Nov. 12, 1935 |
| 2,043,789 | Ansley | June 9, 1936 |
| 2,292,564 | Johnson | Aug. 11, 1942 |
| 2,307,031 | Erwood | Jan. 5, 1943 |
| 2,318,654 | Wissner | Mar. 11, 1943 |
| 2,376,741 | Weaver | May 22, 1945 |
| 2,397,932 | Erwood et al. | Apr. 9, 1946 |
| 2,555,895 | Lynch | June 5, 1951 |

FOREIGN PATENTS

| Number | Country | Date |
|---|---|---|
| 377,173 | Great Britain | Jan. 16, 1931 |
| 822,026 | France | Dec. 18, 1937 |
| 541,156 | Great Britain | Nov. 14, 1941 |
| 111,950 | Sweden | July 27, 1944 |